US008116211B2

(12) United States Patent
Ishii et al.

(10) Patent No.: US 8,116,211 B2
(45) Date of Patent: Feb. 14, 2012

(54) TEST METHOD AND TEST DEVICE (75) Inventors: Hiroyuki Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/143,774

(22) PCT Filed: Jan. 8, 2010

(86) PCT No.: PCT/JP2010/050148
§ 371 (c)(1),
(2), (4) Date: Sep. 15, 2011

(87) PCT Pub. No.: WO2010/079825
PCT Pub. Date: Jul. 15, 2010

(65) Prior Publication Data
US 2012/0002554 A1    Jan. 5, 2012

(30) Foreign Application Priority Data

Jan. 8, 2009  (JP) ............................. P2009-002988
Feb. 2, 2009  (JP) ............................. P2009-022064

(51) Int. Cl.
*H04L 12/26* (2006.01)
*H04B 7/005* (2006.01)
(52) U.S. Cl. ...................................... 370/242; 370/278
(58) Field of Classification Search .......... 370/242–247, 370/277, 278, 282, 328, 332
See application file for complete search history.

(56) References Cited

U.S. PATENT DOCUMENTS

| 6,456,598 B1 * | 9/2002 | Le Strat et al. ............... 370/252 |
| 6,978,139 B2 * | 12/2005 | Adatrao et al. ............... 455/442 |
| 7,089,007 B2 * | 8/2006 | Wakuta et al. ............... 455/436 |
| 7,864,724 B2 * | 1/2011 | Kaikkonen et al. .......... 370/318 |
| 2008/0064386 A1 * | 3/2008 | Nibe ........................... 455/422.1 |
| 2008/0273502 A1 * | 11/2008 | Zeira et al. .................... 370/332 |

OTHER PUBLICATIONS

International Search Report w/translation from PCT/JP2010/050148 dated Mar. 9, 2010 (6 pages).
Japanese Office Action w/translation regarding Reference 2008P00661 dated Mar. 9, 2010 (5 pages).
RAN WG2 Meeting #64, R2-086419; "LTE Radio Link Failure Detection"; Ericsson; Prague, Czech Republic; Nov. 10-14, 2008 (6 pages).
3GPP TS 25.101 V8.2.0; "3rd Generation Partnership Project; Technical Specification Group Radio Access Network; User Equipment (UE) Radio Transmission and Reception (FDD) (Release 8)"; Mar. 2008 (177 pages).
3GPP TS 25.214 V8.1.0; "3rd Generation Partnership Project; Technical Specification Group Radio Access Network; Physical Layer Procedures (FDD) (Release 8)"; Mar. 2008 (87 pages).
3GPP TS 36.101 V8.2.0; "3rd Generation Partnership Project; Technical Specification Group Radio Access Network; Evolved Universal Terrestrial Radio Access (E-UTRA); User Equipment (UE) Radio Transmission and Reception (Release 8)"; May 2008 (66 pages).

\* cited by examiner

*Primary Examiner* — Hong Cho
(74) *Attorney, Agent, or Firm* — Osha Liang LLP (57) ABSTRACT

A test method according to the present invention includes: a first step of determining whether or not the mobile station detects the problem in a radio link state, when a radio quality is changed from a first state where the radio quality is equal to or more than a first threshold value to a second state where the radio quality is equal to or less than the first threshold value; and a second step of determining whether or not the mobile station does not detect the problem in a radio link state, when the radio quality is changed to a third state where the radio quality is equal to more than a second threshold value, after a lapse of a first time interval from a time point at which the radio quality is changed from the first state to the second state.

19 Claims, 6 Drawing Sheets

NOTE 1: N310 COUNTER IS SET TO BE 0.
NOTE 2: T310 TIMER IS SET TO BE 0.
NOTE 3: "C-B" IS A VALUE IN CONSIDERATION OF PROCESS DELAY OF MOBILE STATION 100

FIG. 9

NOTE 1: N310 AND N311 COUNTER IS SET TO BE 0.
NOTE 2: T310 TIMER IS SET TO BE "F−B".
NOTE 3: "F-E" IS A VALUE IN CONSIDERATION OF PROCESS DELAY OF MOBILE STATION
NOTE 4: C−B=G−F

TEST METHOD AND TEST DEVICE

TECHNICAL FIELD

The present invention relates to a test method and a test device.

BACKGROUND ART

Generally, a mobile communication system is configured to monitor a synchronization state between a radio base station and a mobile station. For example, in a mobile communication system of the WCDMA scheme, the following two criteria are defined to determine a downlink synchronization state in a physical layer.

Radio quality (DPCCH quality) of DPCCH (Dedicated Physical Control Channel); and CRC (Cyclic redundancy check) check result Here, the "DPCCH quality" corresponds to a reception quality of pilot symbols or TPC (transmission power control) bits, for example, an SIR (signal-to-interference power ratio) or a reception level, and the "CRC check result" corresponds to a block error rate.

That is, the mobile station determines the synchronization state of the downlink based on the radio quality of DPCCH, for example.

By the way, generally, in the mobile communication system, a test is applied to the mobile station and the radio base station in order to ensure the communication quality.

Figure 1:
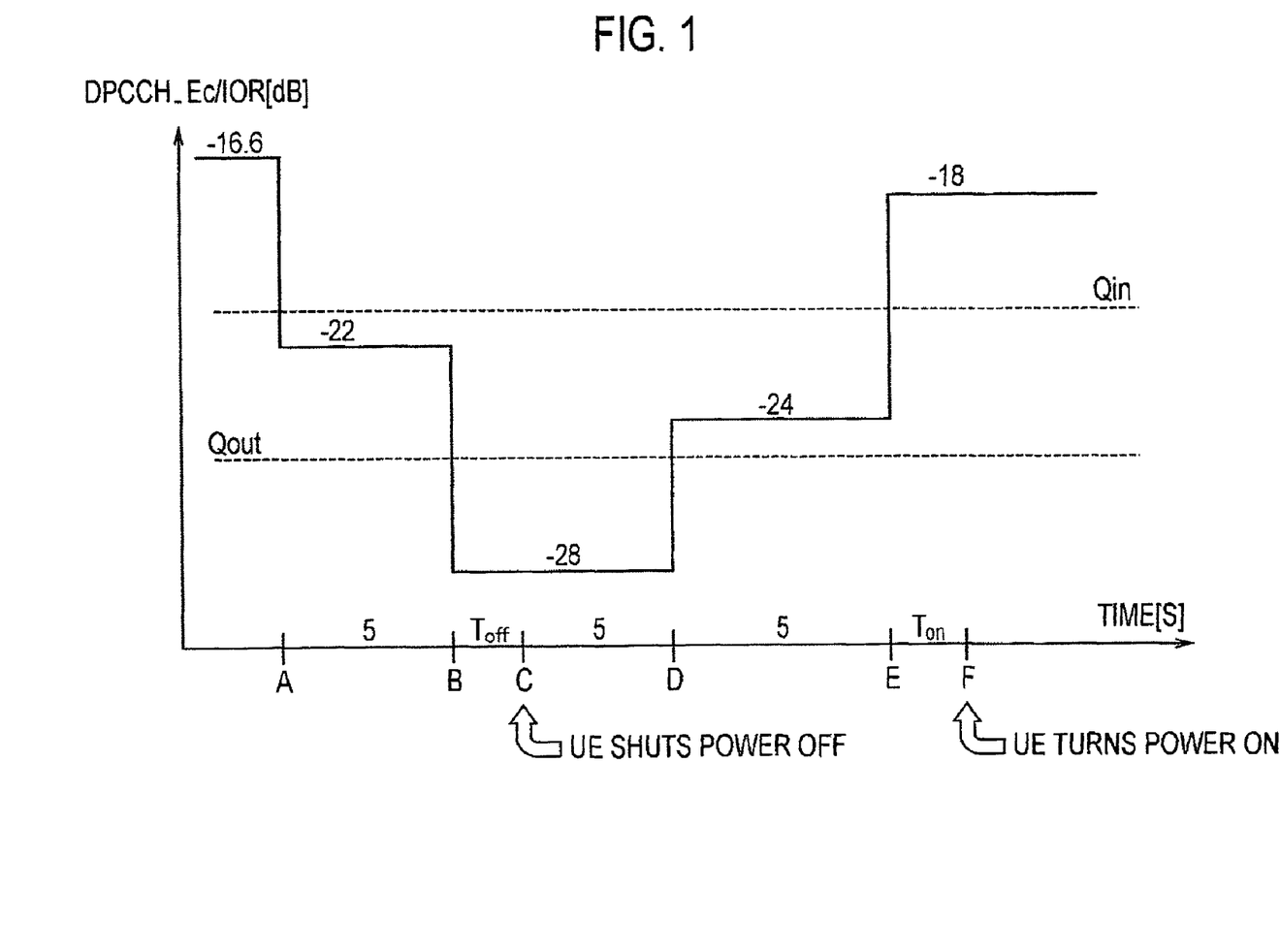
FIG. 1 is a diagram illustrating a method of determining a downlink synchronization state in the WCDMA scheme.

With reference to FIG. 1, a test method of confirming the determination operation of the synchronization state of the downlink in the mobile station of the above-described WCDMA scheme will be explained, below.

In FIG. 1, "DPCCH_Ec/Ior" is a power level of DPCCH, and corresponds to the radio quality of DPCCH. Further, "Qin" and "Qout" are threshold values used for determining the synchronization state of the downlink.

In this case, a state where the synchronization state of the downlink is OK may be referred to as "In-sync (In-Synchronous)", and a state where the synchronization state of the downlink is NG may be referred to as "Out-of-sync (Out-of-Synchronous)".

Moreover, a state where a problem of a radio link state is not detected may be referred to as "In-sync", and a state where the problem of a radio link state is detected may be referred to as "Out-of-sync".

In the test method illustrated in FIG. 1, at time B, the radio quality of DPCCH is changed from a state where it is higher than a predetermined threshold value Qout to a state where it is lower than the same, and at time C, it is confirmed based on the fact that the mobile station stops an uplink signal that the mobile station correctly determines the synchronization state of the downlink.

That is, when detecting Out-of-sync, the mobile station performs an operation to stop the uplink signal, and therefore, if the operation that the mobile station stops the uplink signal is confirmed at time C, then it can be confirmed that the mobile station correctly detects the Out-of-sync.

It is noted that a time difference from time B to time C is set in order to consider a determination delay in the mobile station.

On the other hand, based on the fact that at time E, the radio quality of DPCCH is changed from a state where it is lower than a predetermined threshold value Qin to a state where it is higher than the same, and at time F, the mobile station transmits the uplink signal, it is confirmed that the mobile station correctly determines the synchronization state of the downlink.

That is, when detecting In-sync, the mobile station performs an operation of starting the transmission of the uplink signal, as a result of which at time F, if the operation that the mobile station transmits the uplink signal is confirmed, then the correct detection of In-sync by the mobile station can be confirmed.

It is noted that a time difference from time E to time F is set in order to consider a determination delay in the mobile station.

As described above, in a test method of confirming the determination operation of the synchronization state of the downlink of the mobile station of the WCDMA scheme, the correct determination operation of the synchronization state of the downlink by the mobile station is confirmed based on the fact that the radio quality of DPCCH is varied, and when the radio quality of DPCCH becomes equal to or less than Qout, the mobile station stops transmitting the uplink, and when the radio quality of DPCCH becomes equal to or more than Qin, the mobile station starts transmitting the uplink.

However, there is a case where the above-described test method cannot be applied to a certain mobile communication system.

In the LTE (Long Term Evolution) scheme that is a next generation to the WCDMA scheme, for example, the mobile station stops the uplink signal not at a time point at which the synchronization state of the downlink is determined in a physical layer but at a time point at which a failure of the radio link state is determined in an RRC layer.

At this time, the mobile station starts a process of re-establishing a connection state from the time point at which the failure of the radio link state in the RRC layer is determined, and thus, there is a problem that the test method illustrated in FIG. 1 cannot be applied.

More specifically, at time C in FIG. 1, the mobile station has started the process of re-establishing a connection state at the time point at which it is confirmed that the transmission of the uplink signal is stopped, and therefore, even when the radio quality of DPCCH is larger than Qin at time E, the mobile station does not start transmitting the uplink signal. As a result, the test method illustrated in FIG. 1 cannot be applied.

Therefore, the present invention is intended to overcome the above-described problem. An object of the present invention is to provide a test method and a test device that enable confirmation of whether a mobile station correctly detects a synchronization state of a downlink, even upon starting a process of re-establishing a connection state at a time point at which a failure of a radio link state is detected in an RRC layer.

SUMMARY OF THE INVENTION

A first aspect of the present invention is summarized as a test method of confirming problem detection means in a radio link state in a mobile station, including: a first step of determining whether or not the mobile station detects the problem in a radio link state, when a radio quality is changed from a first state where the radio quality is equal to or more than a first threshold value to a second state where the radio quality is equal to or less than the first threshold value; and a second step of determining whether or not the mobile station does not detect the problem in a radio link state, when the radio quality is changed to a third state where the radio quality is equal to more than a second threshold value, after a lapse of a first time interval from a time point at which the radio quality is changed from the first state to the second state.

In the first aspect of the present invention, in the first step and the second step, determination may be made as to whether or not the mobile station has detected the problem in a radio link state, based on whether or not the mobile station transmits an uplink signal.

In the first aspect of the present invention, in the first step and the second step, determination may be made that the mobile station does not detect the problem in a radio link state, when the mobile station transmits the uplink signal; and determination may be made that the mobile station has detected the problem in a radio link state, when the mobile station does not transmit the uplink signal.

In the first aspect of the present invention, the uplink signal may be a periodically transmitted uplink signal.

In the first aspect of the present invention, the uplink signal may be a sounding reference signal or a control signal indicating a radio quality state of a downlink.

In the first aspect of the present invention, in the second step, the first time interval may be identical to a value of a timer for starting a process of re-establishing a connection state activated from a time point at which the mobile station has detected the problem in a radio link state.

In the first aspect of the present invention, in the first step, determination may be made that the mobile station correctly operates when the mobile station detects the problem in a radio link state.

In the first aspect of the present invention, in the second step, determination may be made that the mobile station correctly operates when the mobile station does not detect the problem in a radio link state.

A second aspect of the present invention is summarized as a test device configured to confirm problem detection means in a radio link state in a mobile station, including: a first determination unit configured to determine whether or not the mobile station detects the problem in a radio link state, when a radio quality is changed from a first state where the radio quality is equal to or more than a first threshold value to a second state where the radio quality is equal to or less than the first threshold value; and a second determination unit configured to determine whether or not the mobile station does not detect the problem in a radio link state, when the radio quality is changed to a third state where the radio quality is equal to or more than a second threshold value, after a lapse of a first time interval from a time point at which the radio quality is changed from the first state to the second state.

As explained above, according to the present invention, it is possible to provide a test method and a test device that enable confirmation of whether a mobile station correctly detects a synchronization state of a downlink, even upon starting a process of re-establishing a connection state at a time point at which a failure of a radio link state is detected in an RRC layer.

DETAILED DESCRIPTION

Configuration of Test System According to First Embodiment of the Present Invention With reference to FIG. 2, a configuration of a test system according to a first embodiment of the present invention will be explained.

Figure 2:
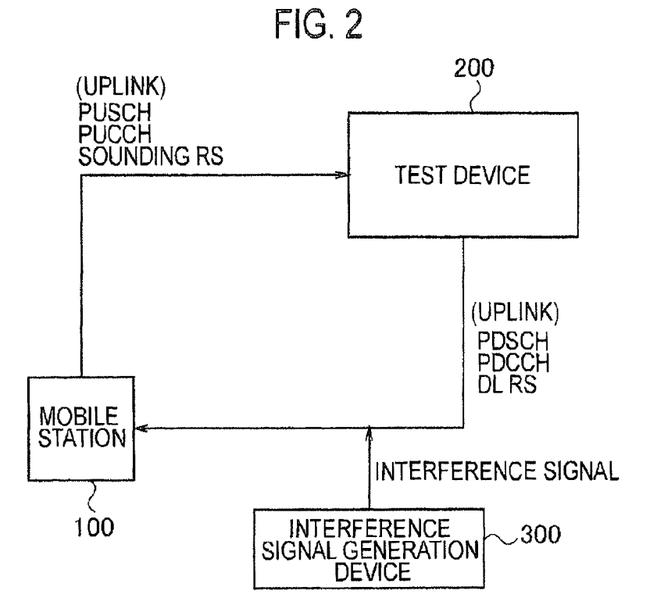
FIG. 2 is a diagram illustrating the configuration of a test system according to this embodiment.

As illustrated in FIG. 2, the test system according to this embodiment is a test system based on a mobile communication system of the LTE scheme, and is for confirming the operation of a mobile station in the mobile communication system of the LTE scheme.

In the test system, as a radio access scheme, the "OFDM (Orthogonal Frequency Division Multiplexing) scheme" is applied to a downlink and the "SC-FDMA (Single-Carrier Frequency Division Multiple Access) scheme" is applied to an uplink.

According to the OFDM scheme, a specific frequency band is divided into a plurality of narrow frequency bands (sub-carriers) and data is loaded on each frequency band and is transmitted. According to the OFDM scheme, the sub-carriers are densely arranged on the frequency axis without interference therebetween although a part of the sub-carriers overlap each other, so that high-rate transmission can be performed and frequency use efficiency can be improved.

The SC-FDMA scheme is a transmission scheme in which a specific frequency band is divided and a plurality of mobile stations UE transmit data using different frequency bands, so that it is possible to reduce interference among the plurality of mobile stations UE. According to the SC-FDMA scheme, because of its characteristic of small variation in transmission power, it is possible to achieve low power consumption and broad coverage of the mobile station UE.

In the test system according to this embodiment, a test device 200 is configured to transmit, to a mobile station 100, a downlink control signal via PDCCH (Physical Downlink Control Channel) and a downlink data signal via PDSCH (Physical Downlink Shared Channel).

Moreover, the test device 200 is configured to transmit Downlink Reference Signal (DL RS) or downlink pilot signal.

Further, in the downlink, an interference signal is transmitted from an interference signal generation device 300 to the mobile station 100.

In the test system according to this embodiment, when signal power of PDCCH, PDSCH and DL RS, and power of the interference signal are adjusted, the radio quality of PDCCH, PDSCH and DL RS at a reception end of the mobile station 100 is adjusted.

In this case, the radio quality is an SIR (Signal-to-Interference Ratio), for example.

On one hand, in the test system according to this embodiment, the mobile station 100 is configured to transmit an uplink data signal via PUSCH (Physical Uplink Shared Channel) in the uplink.

Further, the mobile station 100 is configured to transmit an uplink control signal via PUCCH (Physical Uplink Control Channel) in the uplink.

Further, the mobile station 100 is configured to transmit a random access preamble via PRACH (Physical RandomAccess Channel) in the uplink.

In this case, in the uplink control signal, radio quality information of the downlink (Channel Quality Indication (CQI), Precoding Matrix Indication (PMI), Rank Indication (RI)), a scheduling request, transmission confirmation information for PDSCH (ACK information), etc., are included.

Further, the mobile station 100 is configured to transmit a sounding reference signal (Sounding Reference Signal (Sounding RS)) in the uplink.

In FIG. 2, the test device 200, the mobile station 100, and the interference signal generation device 300 are connected by way of wire, but instead thereof, these may be connected by radio.

Further, in addition to the test device 200, the mobile station 100, and the interference signal generation device 300, a device such as a fading simulator may be additionally connected. When such a fading simulator is connected, it becomes possible to apply a test under a fading environment.

As described later, if whether or not the mobile station 100 correctly determines the synchronization state of the downlink is determined based on whether or not the mobile station 100 has transmitted the random access preamble, then the test device 200 may set a cell which is a destination of connection re-establishment, in addition to a cell in which the mobile station 100 initially communicates, so that the mobile station 100 can perform a connection re-establishment process.

In this case, by performing a cell search when performing a connection re-establishment process, the mobile station 100 searches the cell which is the destination of connection re-establishment, and thereafter, by performing a random access procedure on the cell which is the destination of connection re-establishment, the mobile station 100 performs a connection re-establishment process.

The cell which is the destination of connection re-establishment may be another cell having the same frequency as a cell to which the mobile station 100 initially communicates, for example, or another cell having a different frequency. Further, in the cell which is the destination of the connection re-establishment, a different sector within the same base station for the cell to which the mobile station 100 initially communicates may be included. In either case, in the cell which is a destination of connection re-establishment, UE Context regarding the mobile station 100 is held.

Figure 3:
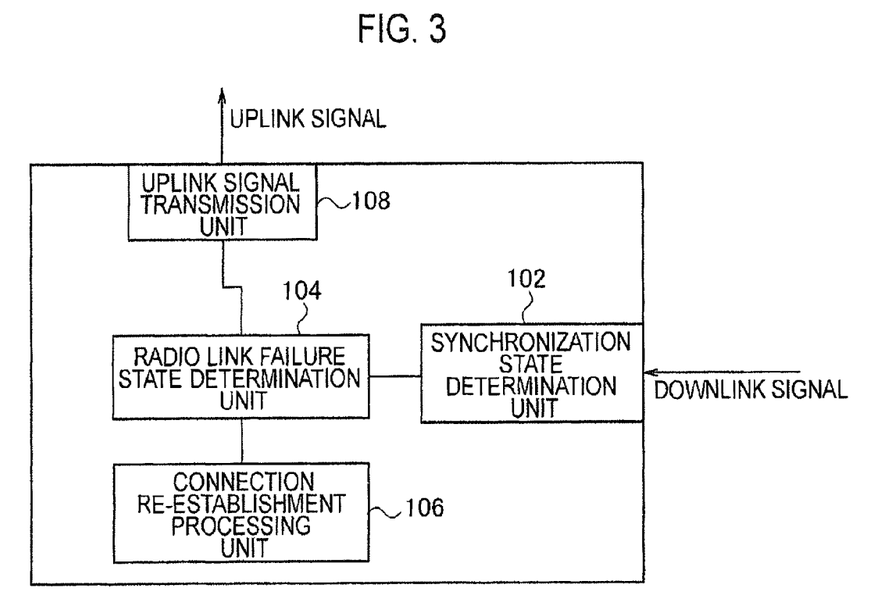
FIG. 3 is a diagram illustrating the configuration of a mobile station according to this embodiment.

As illustrated in FIG. 3, the mobile station 100 includes a synchronization state determination unit 102, a radio link failure state determination unit 104, a connection re-establishment processing unit 106, and an uplink signal transmission unit 108.

The synchronization state determination unit 102 is configured to measure the radio quality of the downlink in the mobile station 100, and to determine the synchronization state of the downlink based on the radio quality.

In this case, the radio quality of the downlink in the mobile station 100 is a quality of a radio link between the test device 200 and the mobile station UE. It is noted that in the mobile communication system to which the LTE scheme is applied, the test device 200 corresponds to the radio base station eNB.

For example, the synchronization state determination unit 102 may measure an SIR of a downlink signal (reference signal (DL RS), for example) of the mobile station 100 as the radio quality of the downlink in the mobile station UE, and may determine the synchronization state of the downlink based on the SIR.

More specifically, the synchronization state determination unit 102 may determine that the synchronization state of the downlink is OK, that is, In-sync, when the SIR is larger than a predetermined threshold value, and determine that the synchronization state of the downlink is NG, that is, Out-of-sync, when the SIR is equal to or less than the predetermined threshold value.

Figure 4:
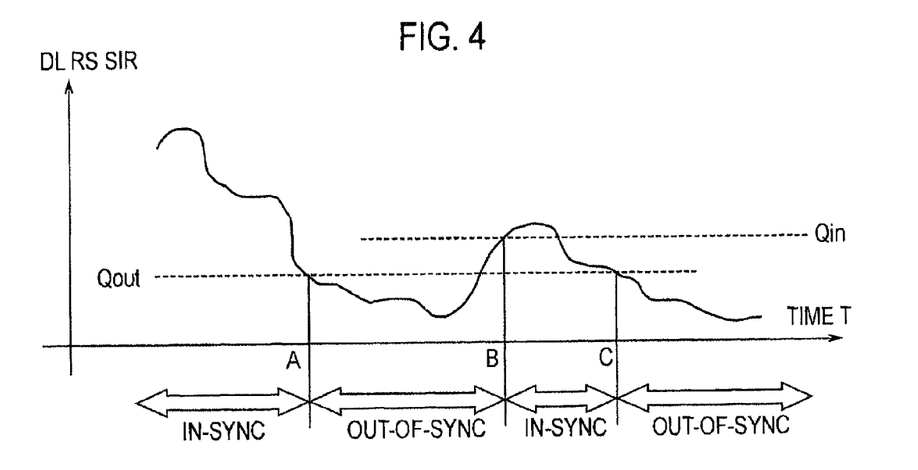
FIG. 4 is a diagram explaining how a synchronization state of a downlink is determined in the mobile station according to this embodiment.

Alternatively, as illustrated in FIG. 4, the synchronization state determination unit 102 may set two threshold values of Qout and Qin, and determine the synchronization state of the downlink based on the above-described SIR, Qout and Qin.

Here, a relationship of Qout<Qin is established and a difference between the Qin and the Qout, that is, "Qin−Qout", corresponds to hysteresis. That is, in the example of FIG. 4, the synchronization state determination unit 102 determines that the synchronization state is the In-sync, because the SIR is larger than the Qout at T<A, and determines that the synchronization state is Out-of-sync based on the fact that the SIR becomes equal to or less than the Qout at time T=A.

Then, the synchronization state determination unit 102 determines that the synchronization state is In-sync based on the fact that the SIR becomes larger than the Qin at time T=B, and thereafter, determines that the synchronization state is Out-of-sync based on the fact that the SIR becomes equal to or less than the Qout at time T=C.

As described above, the two threshold values are set, that is, the hysteresis of "Qin−Qout" is set, so that it is possible to reduce fluctuation in the determination of In-sync and Out-of-sync.

It is noted that the synchronization state determination unit 102 may use a value obtained by averaging instantaneous SIRs in a predetermined average period as the value of the above-described SIR. Here, the predetermined average period may be 160 ms, 200 ms, 20 ms, or other values, for example.

The value of the SIR may be a value obtained by averaging in the entire system band in a frequency direction, or may be a value obtained by averaging in a part of the system band. The part of the band within the system band, for example, may be a band positioned at the center of the system band and having a predetermined bandwidth. Alternatively, the part of the band in the system band, for example, may be a band in which a synchronization signal or a physical broadcast channel is transmitted.

The synchronization state determination unit 102 notifies, to the radio link failure state determination unit 104, the determination result (In-sync/Out-of-sync) of the above-described synchronization state of the downlink.

In addition, the synchronization state determination unit 102 may notify, to the radio link failure state determination unit 104, the determination result (In-sync/Out-of-sync) of the above-described synchronization state of the downlink at every 10 ms. Here, 10 ms is for illustrative purposes only and values other than 10 ms may be employed.

Moreover, the synchronization state determination unit 102 may notify, to the radio link failure state determination unit 104, the determination result (In-sync/Out-of-sync) of the above-described synchronization state of the downlink, for every radio link frame.

Furthermore, in the above-described example, the synchronization state determination unit 102 uses the SIR of the reference signal as the radio quality of the downlink. However, instead of this, Reference Signal Received Power (RSRP), Reference Signal Received Quality (RSRQ) or CQI may be used.

Alternatively, instead of the SIR of the reference signal, the synchronization state determination unit 102 may use an error rate of PDCCH, an error rate of PCFICH, an SIR in PCFICH, an error rate of PDSCH, a symbol error rate of DL RS, etc.

In this case, PCFICH (Physical Control Format Indicator Channel) is a control signal used for notifying the number of OFDM symbols for controlling the downlink.

Alternately, the synchronization state determination unit 102 may use at least one of the SIR of the reference signal, the reference signal received power, RSRQ, CQI, the error rate of PDCCH, the error rate of PCFICH, the SIR of PCFICH, the error rate of PDSCH, and the symbol error rate of DL RS, as the radio quality of the downlink.

It is noted that RSRQ (Reference Signal Received Quality Power) is a value obtained by dividing the reference signal received power of the downlink by RSSI (Received Signal Strength Indicator) of the downlink.

Here, the RSSI refers to a total reception level observed in the mobile station and the total reception level including all of thermal noise, an interference power from other cells, a power of a desired signal from an own cell, and the like.

Further, the CQI (Channel Quality Indication) is radio quality information of the downlink.

The radio link failure state determination unit 104 is configured to determine whether or not the current communication state is a radio link failure state (RLF (Radio Link Failure)) based on the determination result of the synchronization state of the downlink in the above-mentioned synchronization state determination unit 102.

Figure 5:
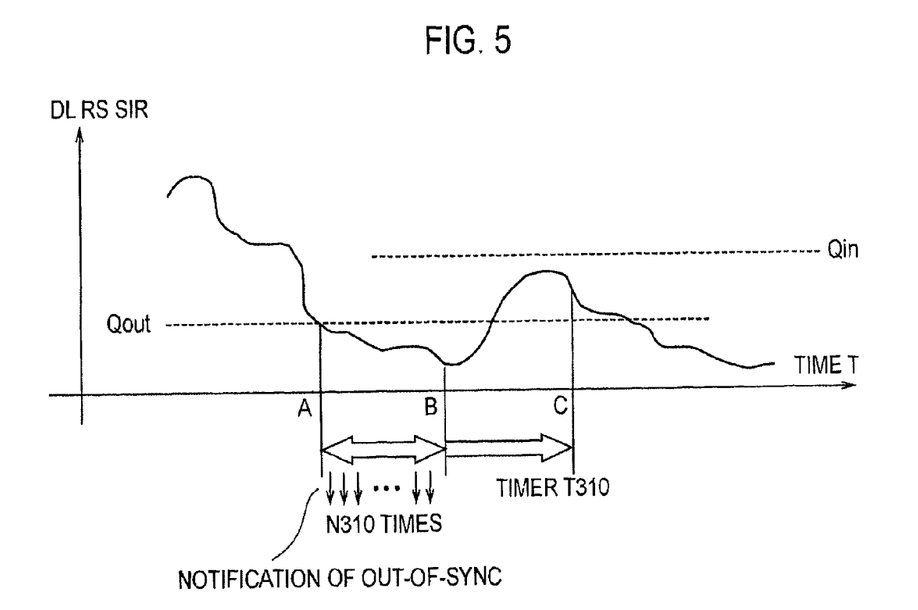
FIG. 5 is a diagram explaining how a radio link failure state is detected in the mobile station according to this embodiment.

For example, the radio link failure state determination unit 104 may start a timer T310 when Out-of-sync is reported from the synchronization state determination unit 102 successive N310 times, and may determine that the current communication state is the radio link failure state when the timer T310 is expired. More specifically, as illustrated in FIG. 5, between time T=A and time T=B, the radio link failure state determination unit 104 receives a notification indicating Out-of-sync as the synchronization state of the downlink successive N310 times from the synchronization state determination unit 1023.

In such a case, at time T=B, the radio link failure state determination unit 104 activates a timer T310. Then, when the timer T310 expires (at time T=C), the radio link failure state determination unit 104 determines that the current communication state is the radio link failure state.

The timer T310 corresponds to a timer for starting a process of re-establishing the connection state, which is activated at a time point at which the mobile station detects a problem of the radio link state.

Figure 6:
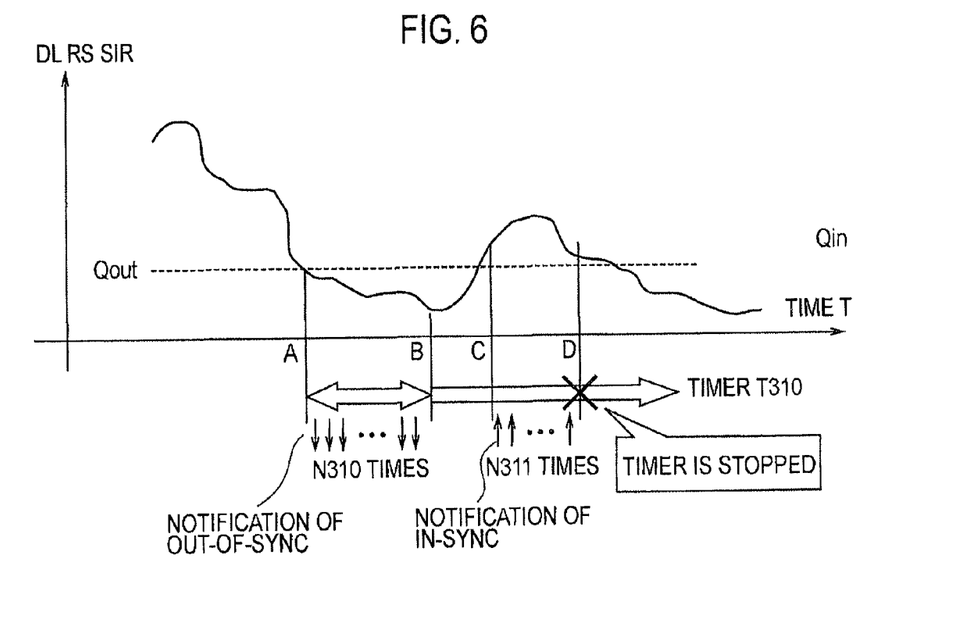
FIG. 6 is a diagram explaining how an In-sync is detected in the mobile station according to this embodiment.

As illustrated in FIG. 6, while the timer T310 is activated, the radio link failure state determination unit 104 receives a notification that is In-sync as the synchronization state of the downlink successive N311 times between time T=C and time T=D, from the synchronization state determination unit 102.

In such a case, at time T=D, the radio link failure state determination unit 104 stops the timer T310. In this case, since the timer T310 is stopped before the expiry, the radio link failure state determination unit 104 does not determine that the current communication state is the radio link failure state.

In addition, in the above-described example, N310 and N311 are threshold values regarding the number of times by which Out-of-sync or In-sync is continuously notified. However, instead of this, N310 and N311 may be threshold values regarding a time period during which Out-of-sync or In-sync is continuously notified.

That is, N310 or N311 may be treated as a timer, similarly to the T310. That is, the above-described N310 or N311, which serves as a unit, may be the number of times by which the synchronization state is notified from the synchronization state determination unit 102, and instead thereof, may be a time period at which the synchronization state is notified from the synchronization state determination unit 102.

When it is determined that the current communication state is the radio link failure state, the radio link failure state determination unit 104 notifies, to the connection re-establishment processing unit 106 and the uplink signal transmission unit 108, the determination result.

It is noted that the radio link failure state determination unit 104 may notify, to the connection re-establishment processing unit 106 and the uplink signal transmission unit 108, a result that the timer T310 is expired, instead of the determination result that the current communication state is the radio link failure state.

When the determination result indicating the current communication state is the radio link failure state is notified from the radio link failure state determination unit 104, the connection re-establishment processing unit 106 performs a connection re-establishment process. Moreover, the connection re-establishment processing unit 106 may clear a setting (Configuration) of the communication between the mobile station 100 and the test device 200 before performing the connection re-establishment process.

In addition, the connection re-establishment process may be called, for example, "Cell Update process". Furthermore, the "Cell Update process", for example, refers to process in which a cell is searched, the radio quality of the searched cell is measured, and process of re-establishing a connection to the cell when there is a communicable cell.

In this case, when the mobile station 100 re-establishes the connection to the cell, firstly, the mobile station 100 performs a random access procedure on the cell. That is, when the mobile station 100 re-establishes the connection to the cell, the mobile station transmits a random access preamble via PRACH, to the cell.

In addition, the "Cell Update process" may be called "Connection Re-establishment process".

It is noted that the above-described "when the determination result indicating that the current communication state is the radio link failure state is notified from the radio link failure state determination unit 104" may also mean "when a result indicating that the timer T310 is expired is notified from the radio link failure state determination unit 104".

That is, when the result indicting that the timer T310 is expired is notified from the radio link failure state determination unit 104, the connection re-establishment processing unit 106 may perform the connection re-establishment process.

The uplink signal transmission unit 108 transmits the uplink signal to the test device 200 in the uplink.

In this case, in the uplink signal, reference signals for PUSCH, PUCCH, sounding RS, etc., are included. It is noted that CQI, PMI, RI, etc., that are radio quality information of the downlink may be transmitted by way of the PUCCH.

The uplink signal transmission unit 108 stops the transmission of the uplink signal, when the determination result indicating that the current communication state is the radio link failure state is notified from the radio link failure state determination unit 104.

It is noted that the above-described "when the determination result indicating that the current communication state is the radio link failure state is notified from the radio link failure state determination unit 104" may also mean "when a result indicating that the timer T310 is expired is notified from the radio link failure state determination unit 104".

That is, the uplink signal transmission unit 108 may stop the transmission of the uplink signal when the result indicating that the timer T310 is expired is notified from the radio link failure state determination unit 104.

It is noted that as described above, when the uplink signal transmission unit 108 re-establishes the connection to the cell, which the mobile station 100 can communicate, in the connection re-establishment process, the uplink signal transmission unit 108 may transmit the random access preamble via PRACH, to the cell, which the mobile station 100 can communicate.

In the above-described example, an example in which the mobile station 100 transmits PUSCH or PUCCH in the uplink is described; however, instead thereof, an operation in which the mobile station 100 does not transmit PUSCH or PUCCH will be described below. For example, in the LTE, if Uplink Time Alignment is not maintained, or if DRX (Discontinuous Reception Control) is applied, then basically, the mobile station 100 does not transmit the above-described uplink signal, i.e., PUSCH or PUCCH.

In this case, the uplink signal transmission unit 108 may be configured not to transmit the above-described reference signals for PUSCH, PUCCH, sounding RS, etc., but to transmit the random access preamble via PRACH in the above-described reconnection process.

Figure 7:
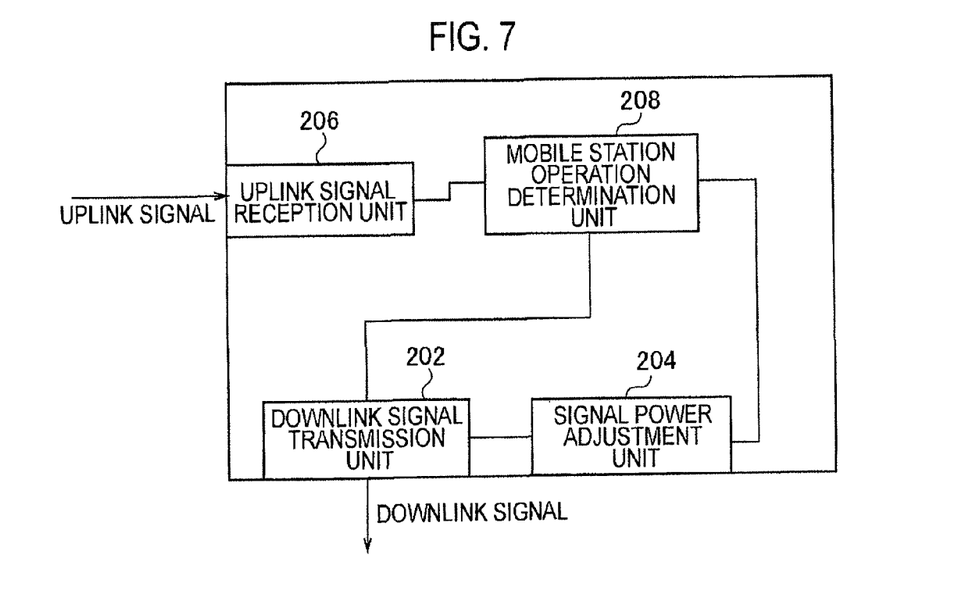
FIG. 7 is a diagram illustrating the configuration of a test device according to this embodiment.

As illustrated in FIG. 7, the test device 200 includes a downlink signal transmission unit 202, a signal power adjustment unit 204, an uplink signal reception unit 206, and a mobile station operation determination unit 208.

The downlink signal transmission unit 202 is configured to transmit the downlink signal to the mobile station 100. PDSCH, PDCCH, DL RS, PCFICH, etc., are included in the downlink signal.

Further, the downlink signal transmission unit 202 sets the signal power of the downlink based on the information relating to the signal power notified from the signal power adjustment unit 204 described later, and transmits the downlink signal based on the downlink signal power.

The signal power adjustment unit 204 adjusts the signal power of the downlink signal so that the radio quality at the reception end of the mobile station 100 is set to a predetermined value, and notifies, to the downlink signal transmission unit 202, the adjusted result as the information relating to the signal power.

The signal power adjustment unit 204 may adjust the transmission power of the downlink signal at each time based on the radio quality, notified from the mobile station operation determination unit 208, of the downlink at the reception end of the mobile station at each time, as described later, when the signal power adjustment unit 204 adjusts the transmission power of the downlink signal.

It is noted that in the present process, the radio quality of the downlink signal at the reception end of the above-described mobile station 100 may be adjusted, by a result that the power of the interference signal from the interference signal generation device 300 is fixed, and in the signal power adjustment unit 204, the signal power of the downlink signal is adjusted.

Alternately, the radio quality of the downlink signal at the reception end of the above-described mobile station 100 may be adjusted, by a result that the signal power of the downlink signal set in the signal power adjustment unit 204 is fixed, and the power of the interference signal from the interference signal generation device 300 is adjusted.

Moreover, the radio quality of the downlink signal at the reception end of the above-described mobile station 100 may be adjusted, by a result that the signal power of the downlink signal set in the signal power adjustment unit 204 and the power of the interference signal from the interference signal generation device 300 are both adjusted.

The uplink signal reception unit 206 receives the uplink signal transmitted from the mobile station 100. In this case, PUSCH, PUCCH, Sounding RS, etc., are included in the uplink signal.

In addition, the uplink signal reception unit 206 receives the random access preamble transmitted from the mobile station 100.

Further, the uplink signal reception unit 206 determines whether or not the mobile station 100 transmits the uplink signal by measuring the quality of the uplink signal (signal power, an SIR, etc.) transmitted from the mobile station 100. It is noted that as long as whether or not the mobile station 100 transmits the uplink signal can accurately be determined, it is possible to determine whether or not the mobile station 100 transmits the uplink signal by using a method other than those described above.

Then, the uplink signal reception unit 206 notifies, to the mobile station operation determination unit 208, the information about whether or not the mobile station 100 transmits the uplink signal.

Alternately, in receipt of the random access preamble transmitted from the mobile station 100, the uplink signal reception unit 206 notifies, to the mobile station operation determination unit 208, the information that the mobile station 100 has transmitted the random access preamble.

In this case, the uplink signal reception unit 206 may receive the random access preamble as the cell, which the mobile station 100 can communicate, in the above-described reconnection process.

That is, the uplink signal reception unit 206 may receive the random access preamble as a cell different from the cell to which the mobile station 100 has originally communicated, for example.

The cell different from the cell, to which the mobile station 100 has originally communicated, may be a different cell having the same frequency, or a cell having a different frequency, for example. Moreover, a different sector within the identical base station may be included in the different cell.

The mobile station operation determination unit 208 determines whether or not the mobile station 100 correctly determines the synchronization state of the downlink, i.e., whether or not the mobile station 100 correctly detects a problem in the radio link of the downlink.

More specifically, the mobile station operation determination unit 208 determines whether or not the mobile station 100 correctly determines the synchronization state of the downlink, based on the information, notified from the uplink signal transmission unit 108, about whether or not the mobile station 100 transmits the uplink signal.

Figure 8:
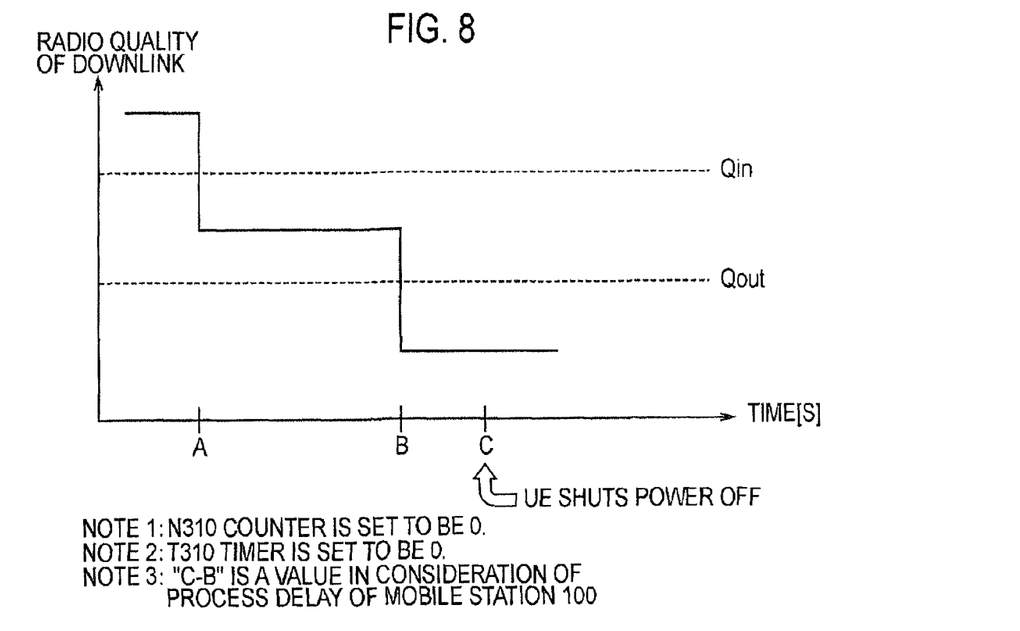
FIG. 8 is a diagram illustrating a test method according to this embodiment.
Figure 9:
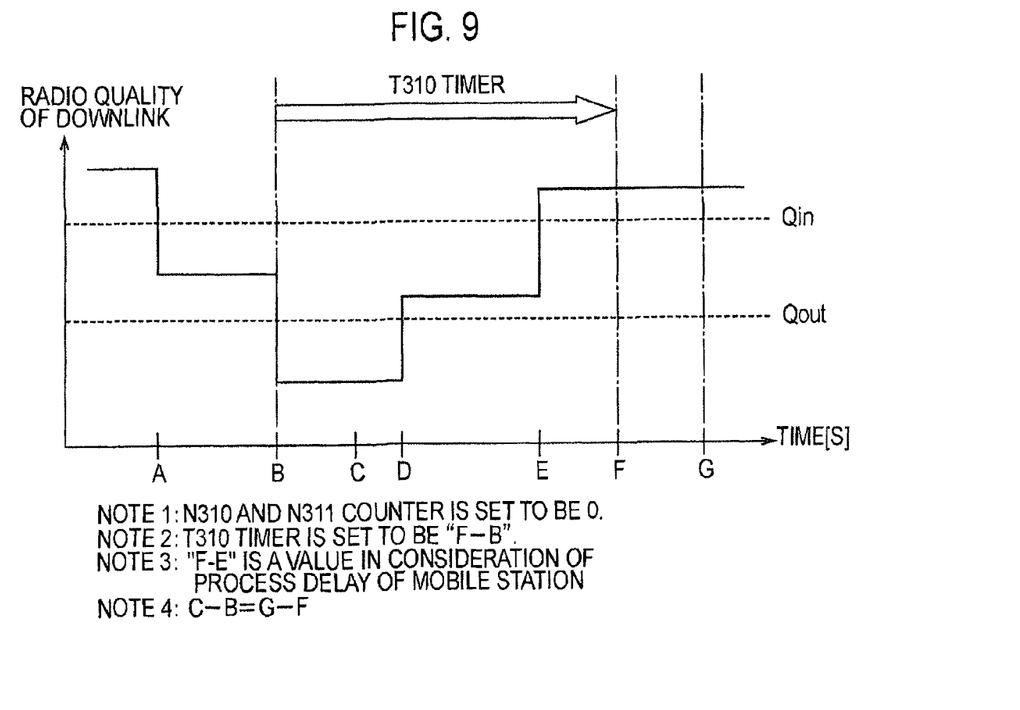
FIG. 9 is a diagram illustrating the test method according to this embodiment.

In this case, the mobile station operation determination unit 208 determines whether or not the mobile station 100 correctly determines the synchronization state of the downlink, by changing the radio quality, in terms of time, of the downlink at the reception end of the mobile station 100, as illustrated in FIG. 8 and FIG. 9.

In this case, by notifying, to the signal power adjustment unit 204, the radio quality of the downlink at the reception end of the mobile station at each time, the mobile station operation determination unit 208 may change the radio quality of the downlink at the reception end of the mobile station in terms of time.

By using FIG. 8 and FIG. 9, the test method for confirming whether or not the mobile station 100 correctly determines the synchronization state of the downlink in the test system according to the present embodiment will be explained, below.

By using FIG. 8, a test method for confirming whether or not the mobile station correctly determines the synchronization state of the downlink in a case where the radio quality of the downlink is changed from a good state to a poor state will be explained.

Firstly, in the test, N310 is set to 0 and the timer T310 is set to "0 ms". Further, in the uplink, the mobile station 100 is set to transmit a periodical signal.

In this case, the periodical signal may be PUCCH by which Sounding RS or CQI/PMI/RI is used for transmitting, for example. Further, a transmission cycle of the periodical signal may be 2 ms. It is noted that the transmission cycle of the periodical signal may be set to a value other than 2 ms, but the smaller the value, the more desirable.

At time B, the mobile station operation determination unit 208 changes the radio quality of the downlink from a state larger than Qout to a state smaller than Qout.

At time C, the mobile station operation determination unit 208 determines whether or not the mobile station 100 correctly determines the synchronization state of the downlink, based on whether or not the mobile station 100 transmits the uplink signal.

More specifically, when the mobile station 100 does not transmit the uplink signal, the mobile station operation determination unit 208 determines that the mobile station 100 detects Out-of-sync and determines that the mobile station 100 correctly determines the synchronization state of the downlink, and when the mobile station 100 transmits the uplink signal, the mobile station operation determination unit 208 determines that the mobile station 100 does not detect Out-of-sync and determines that the mobile station 100 does not correctly determine the synchronization state of the downlink.

In this case, the above-described determination process is based on an operation in which as a result that the value of N310 is "0" and the timer T310 is "0 ms", the mobile station 100 determines the radio link failure state at the moment the radio quality of the downlink becomes smaller than Qout, and stops the transmission of the uplink signal.

It is noted that a time period from time B to time C is set in consideration of a process delay in the mobile station 100.

Further, in the above-described example, the value of N310 is "0" and the value of the timer T310 is "0 ms"; however, a value other than those may be used. In this case, based on the values of N310 and T310, time C is set.

It is noted that in the above-described example, the process of the mobile station operation determination unit 208 in a case where the mobile station 100 transmits PUSCH or PUCCH in the uplink is described; however, instead thereof, a process of the mobile station operation determination unit 208 in a case where PUSCH or PUCCH is not transmitted is described, below.

In this case, the case where PUSCH or PUCCH is not transmitted is a case where Uplink Time Alignment is not maintained or a case where DRX (Discontinuous Reception Control) is applied.

In this case, at time C, the mobile station operation determination unit 208 determines whether or not the mobile station 100 correctly determines the synchronization state of the downlink based on whether or not the mobile station 100 has transmitted the random access preamble, instead of determining whether or not the mobile station 100 correctly determines the synchronization state of the downlink based on whether or not the mobile station 100 transmits the uplink signal.

More specifically, when it is determined that the mobile station 100 has transmitted the random access preamble, the mobile station operation determination unit 208 determines that the mobile station 100 has detected Out-of-sync and determines that the mobile station 100 correctly determines the synchronization state of the downlink, and when it is determined that the mobile station 100 has not transmitted the random access preamble, the mobile station operation determination unit 208 determines that the mobile station 100 has not detected Out-of-sync and determines that the mobile station 100 does not correctly determine the synchronization state of the downlink.

By using FIG. 9, a test method for confirming whether or not the mobile station correctly determines the synchronization state of the downlink in a case where the radio quality of the downlink is changed from a poor state to a good state will be explained.

Firstly, in the test, N310 and N311 are set to "0", and the timer T310 is set to a time interval from time B to time F. Alternately, the time F is set to a time that is reached with a lapse by the timer T310 from time B. Moreover, the time interval from time B to time C is set identical to the time interval from time F to time G.

Further, in the uplink, the mobile station 100 is set to transmit a periodical signal. In this case, the periodical signal may be PUCCH by which Sounding RS or CQI/PMI/RI is used for transmitting, for example. Further, a transmission cycle of the periodical signal may be 2 ms. It is noted that the transmission cycle of the periodical signal may be set to a value other than 2 ms, but the smaller the value, the more desirable.

At time B, the mobile station operation determination unit 208 changes the radio quality of the downlink from a state larger than Qout to a state smaller than Qout.

At time E, the mobile station operation determination unit 208 changes the radio quality of the downlink from a state smaller than Qin to a state larger than Qin.

At time G, the mobile station operation determination unit 208 determines whether or not the mobile station 100 correctly determines the synchronization state of the downlink based on whether or not the mobile station 100 transmits the uplink signal.

More specifically, when the mobile station 100 transmits the uplink signal, the mobile station operation determination unit 208 determines that the mobile station 100 detects In-sync and determines that the mobile station 100 correctly determines the synchronization state of the downlink, and when the mobile station 100 does not transmit the uplink signal, the mobile station operation determination unit 208 determines that the mobile station 100 does not detect In-sync and determines that the mobile station 100 does not correctly determine the synchronization state of the downlink.

In this case, the above-described determination process is based on an operation in which as a result that the values of N310 and N311 are "0" and the timer T310 is set to the time interval from time B to time F, the mobile station 100 activates the timer T310 at the moment the radio quality of the downlink becomes smaller than Qout, and stops the timer T310 the moment the radio quality of the downlink becomes larger than Qin during the activation of the timer T310.

Conversely, if the mobile station does not detect In-sync between time E and time G, then the timer T310 is not stopped, and therefore, it is probable that the timer T310 is expired by time G.

In this case, the mobile station 100 stops the transmission of the uplink signal and starts the connection re-establishment process, and as a result, this means that the mobile station 100 has not transmitted the uplink signal at time G.

It is noted that a time period from time E to time F is set in consideration of a process delay in the mobile station 100.

Further, in the above-described example, the values of N310 and N311 are 0 and the value of the timer T310 is the time interval from time B to time F; however, a value other than those above may be used. In this case, based on the values of N310, N311, and T310, time G is set.

It is noted that in the above-described example, the process of the mobile station operation determination unit 208 in a case where the mobile station 100 transmits PUSCH or PUCCH in the uplink is described; however, instead thereof, a process of the mobile station operation determination unit 208 in a case where PUSCH or PUCCH is not transmitted is described, below.

In this case, the case where PUSCH or PUCCH is not transmitted is a case where Uplink Time Alignment is not maintained or a case where DRX (Discontinuous Reception Control) is applied.

In this case, at time G, the mobile station operation determination unit 208 determines whether or not the mobile station 100 correctly determines the synchronization state of the downlink based on whether or not the mobile station 100 has transmitted the random access preamble, instead of determining whether or not the mobile station 100 correctly determines the synchronization state of the downlink based on whether or not the mobile station 100 transmits the uplink signal.

More specifically, when it is determined that the mobile station 100 has not transmitted the random access preamble, the mobile station operation determination unit 208 determines that the mobile station 100 detects In-sync and determines that the mobile station 100 correctly determines the synchronization state of the downlink, and when it is determined that the mobile station 100 has transmitted the random access preamble, the mobile station operation determination unit 208 determines that the mobile station 100 has not detected In-sync and determines that the mobile station 100 does not correctly determine the synchronization state of the downlink.

It is noted that the method of determining whether or not the mobile station 100 correctly determines the synchronization state of the downlink based on whether or not the mobile station 100 transmits the uplink signal at the above-described time G is based on the assumption that the timer T310 is activated between time B and time C.

It is considered that the operation that the mobile station 100 activates the timer T310 between time B and time C is guaranteed by the above-described test method described by using FIG. 8.

It is noted that in the above-described example, the test device 200 determines whether or not the mobile station 100 correctly determines the synchronization state of the downlink based on whether or not the mobile station 100 transmits the uplink signal; however, instead thereof, the test device 200 may determine whether or not the mobile station 100 correctly determines the synchronization state of the downlink based on whether or not the mobile station 100 has performed the connection re-establishment process.

In this case, a state where the mobile station 100 transmits the uplink signal corresponds to a state where the mobile station 100 has not performed the connection re-establishment process, and a state where the mobile station 100 does not transmit the uplink signal corresponds to a state where the mobile station 100 has performed or performs the connection re-establishment process.

(Operation of Test System According to First Embodiment of the Present Invention)

Figure 10:
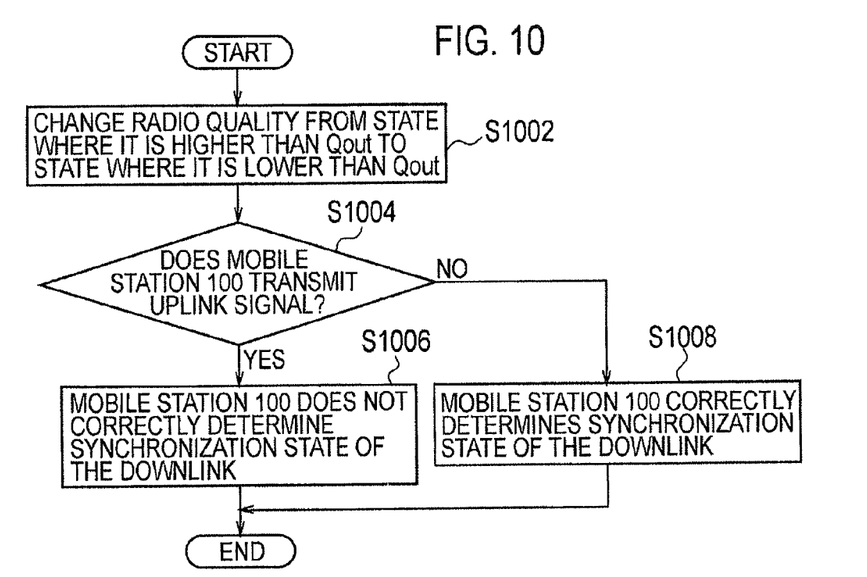
FIG. 10 is a flowchart illustrating the test method according to this embodiment.
Figure 11:
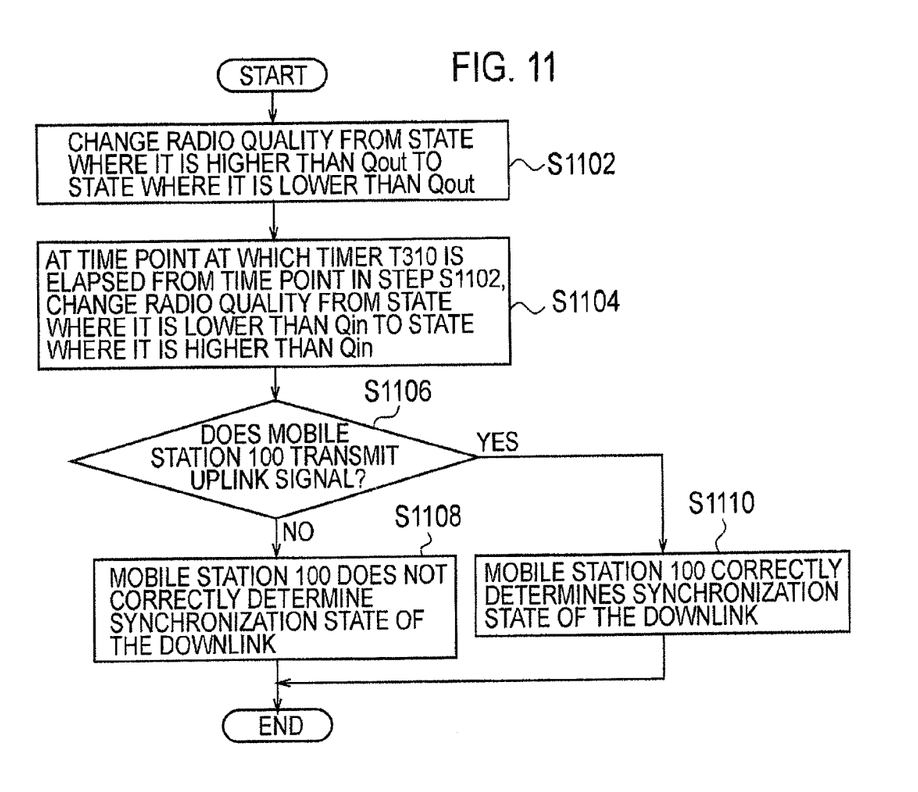
FIG. 11 is a flowchart illustrating the test method according to this embodiment.

With reference to FIG. 10 and FIG. 11, the operation of the test system according to the first embodiment of the present invention will be explained.

By using FIG. 10, a test method (operation) of appropriately confirming the determination of the synchronization state of the downlink when the state of the mobile station 100 changes from a state where the radio quality is good to a state where the radio quality is poor will be explained.

In step S1002, the test device 200 changes the radio quality at the reception end of the downlink in the mobile station 100 from a state where the radio quality is higher than Qout to a state where the radio quality is lower than Qout.

In step S1004, the test device 200 determines whether or not the mobile station 100 transmits the uplink signal.

It is noted that the test device 200 may determine whether or not the mobile station 100 has performed the connection re-establishment process, instead of whether or not the mobile station 100 transmits the uplink signal. In this case, the operation that the uplink signal is transmitted corresponds to the operation that the connection re-establishment process has not been performed, and the operation that the uplink signal is not transmitted corresponds to the operation that the connection re-establishment process has been performed.

When the mobile station 100 transmits the uplink signal (step S1004: YES), the process proceeds to step S1006.

In step S1006, the test device 200 determines that the mobile station 100 does not correctly determine the synchronization state of the downlink.

When the mobile station 100 does not transmit the uplink signal (step S1004: NO), the process proceeds to step S1008.

In step S1008, the test device 200 determines that the mobile station 100 correctly determines the synchronization state of the downlink.

By using FIG. 11, a test method (operation) of appropriately confirming the determination of the synchronization state of the downlink when the state of the mobile station 100 changes from a state where the radio quality is poor to a state where the radio quality is good will be explained.

In step S1102, the test device 200 changes the radio quality at the reception end of the downlink in the mobile station 100 from a state where the radio quality is higher than Qout to a state where the radio quality is lower than Qout.

In step S1104, at a time point at which it has been elapsed by the timer T310 from a time point in step S1102, the test device 200 changes the radio quality at the reception end of the downlink in the mobile station 100 from a state where the radio quality is lower than Qin to a state where the radio quality is higher than Qin.

In step S1106, the test device 200 determines whether or not the mobile station 100 transmits the uplink signal.

It is noted that the test device 200 may determine whether or not the mobile station 100 has performed the connection re-establishment process, instead of whether or not the mobile station 100 transmits the uplink signal. In this case, the operation that the uplink signal is transmitted corresponds to the operation that the connection re-establishment process has not been performed, and the operation that the uplink signal does not transmitted corresponds to the operation that the connection re-establishment process has been performed.

When the mobile station 100 does not transmit the uplink signal (step S1106: NO), the process proceeds to step S1108.

In step S1108, the test device 200 determines that the mobile station 100 does not correctly determine the synchronization state of the downlink.

When the mobile station 100 transmits the uplink signal (step S1106: NO), the process proceeds to step S1110.

In step S1110, the test device 200 determines that the mobile station 100 correctly determines the synchronization state of the downlink.

(Operation and Effect of the Mobile Communication System According to the First Embodiment of the Present Invention)

According to the mobile communication system based on the first embodiment of the present invention, it is possible to confirm whether or not the mobile station correctly detects a synchronization state of a downlink even when the process of re-establishing the connection state is started at a time point at which the mobile station detects the failure of the radio link state in the RRC layer, and as a result, it is possible to guarantee the operation quality of the mobile station, which results in stability of a communication quality in the mobile communication system and serves to improve user's convenience.

The operation of the above-described test device 200, the mobile station 100 and the interference signal generation device 300 may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM) EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the test device 200, the mobile station 100 and the interference signal generation device 300. As a discrete component, such a storing medium and processor may be arranged in the test device 200, the mobile station 100 and the interference signal generation device 300.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A test method of confirming problem detection means in a radio link state in a mobile station, comprising:
    a first step of determining whether or not the mobile station detects the problem in a radio link state based on whether or not the mobile station transmits an uplink signal, when a radio quality is changed from a first state where the radio quality is equal to or more than a first threshold value to a second state where the radio quality is equal to or less than the first threshold value; and
    a second step of determining whether or not the mobile station does not detect the problem in a radio link state based on whether or not the mobile station transmits an uplink signal, when the radio quality is changed to a third state where the radio quality is equal to more than a second threshold value, after a lapse of a first time interval from a time point at which the radio quality is changed from the first state to the second state.

2. The test method according to claim 1, wherein in the first step and the second step,
    determination is made that the mobile station does not detect the problem in a radio link state, when the mobile station transmits the uplink signal; and
    determination is made that the mobile station has detected the problem in a radio link state, when the mobile station does not transmit the uplink signal.

3. The test method according to claim 2, wherein the uplink signal is a periodically transmitted uplink signal.

4. The test method according to claim 3, wherein the uplink signal is a sounding reference signal or a control signal indicating a radio quality state of a downlink.

5. The test method according to claim 4, wherein
    in the second step, the first time interval is identical to a value of a timer for starting a process of re-establishing a connection state activated from a time point at which the mobile station has detected the problem in a radio link state.

6. The test method according to claim 3, wherein
    in the second step, the first time interval is identical to a value of a timer for starting a process of re-establishing a connection state activated from a time point at which the mobile station has detected the problem in a radio link state.

7. The test method according to claim 2, wherein
    in the first step, determination is made that the mobile station correctly operates when the mobile station has detected the problem in a radio link state, and
    in the second step, determination is made that the mobile station correctly operates when the mobile station has not detected the problem in a radio link state.

8. The test method according to claim 2, wherein the uplink signal is a radio quality information of a downlink.

9. The test method according to claim 2, wherein
    in the second step, the first time interval is identical to a value of a timer for starting a process of re-establishing a connection state activated from a time point at which the mobile station has detected the problem in a radio link state.

10. The test method according to claim 1, wherein
    in the second step, the first time interval is identical to a value of a timer for starting a process of re-establishing a connection state activated from a time point at which the mobile station has detected the problem in a radio link state.

11. The test method according to claim 10, wherein
    in the second step, the timer is activated at the time the mobile station detects Out-of-Sync successive predetermined times.

12. The test method according to claim 1, wherein
    in the first step, determination is made that the mobile station correctly operates when the mobile station has detected the problem in a radio link state, and
    in the second step, determination is made that the mobile station correctly operates when the mobile station has not detected the problem in a radio link state.

13. The test method according to claim 12, wherein the uplink signal is a periodically transmitted uplink signal.

14. The test method according to claim 12, wherein the uplink signal is a radio quality information of a downlink.

15. The test method according to claim 12, wherein
in the second step, the first time interval is identical to a value of a timer for starting a process of re-establishing a connection state activated from a time point at which the mobile station has detected the problem in a radio link state.

16. The test method according to claim 1, wherein the uplink signal is a periodically transmitted uplink signal.

17. The test method according to claim 1, wherein the uplink signal is a radio quality information of a downlink.

18. The test method according to claim 17, wherein
in the second step, the first time interval is identical to a value of a timer for starting a process of re-establishing a connection state activated from a time point at which the mobile station has detected the problem in a radio link state.

19. A test device configured to confirm problem detection means in a radio link state in a mobile station, comprising:
 a first determination unit configured to determine whether or not the mobile station detects the problem in a radio link state based on whether or not the mobile station transmits an uplink signal, when a radio quality is changed from a first state where the radio quality is equal to or more than a first threshold value to a second state where the radio quality is equal to or less than the first threshold value; and
 a second determination unit configured to determine whether or not the mobile station does not detect the problem in a radio link state based on whether or not the mobile station transmits an uplink signal, when the radio quality is changed to a third state where the radio quality is equal to more than a second threshold value, after a lapse of a first time interval from a time point at which the radio quality is changed from the first state to the second state.

\* \* \* \* \*